W. G. C. KRAUSE & G. H. THOMAS.
BUNG EXTRACTOR.
APPLICATION FILED APR. 1, 1911.

1,107,804.

Patented Aug. 18, 1914.

Witnesses
Joan L. Morehouse
Ruth M. Worden

Inventors
William G. C. Krause
and George H. Thomas
By Chamberlain & Numman Attorneys

UNITED STATES PATENT OFFICE.

WILLIAM G. C. KRAUSE AND GEORGE H. THOMAS, OF WATERBURY, CONNECTICUT; SAID THOMAS ASSIGNOR TO SAID KRAUSE.

BUNG-EXTRACTOR.

1,107,804.  Specification of Letters Patent.  Patented Aug. 18, 1914.

Application filed April 1, 1911. Serial No. 618,289.

*To all whom it may concern:*

Be it known that we, WILLIAM G. C. KRAUSE and GEORGE H. THOMAS, citizens of the United States, and residents of Waterbury, in the county of New Haven and State of Connecticut, have invented certain new and useful Improvements in Bung-Extractors, of which the following is a specification.

This invention relates to a new and useful tool for use in liquor warehouses, stores, breweries and similar places, for extracting the bungs or plugs from liquor casks or barrels, and may also be employed to advantage for other purposes.

It is the object of the invention to provide a bung extractor of the above class which is more durable, useful and practical than those now upon the market, and particularly to provide a bung extractor, the blade or spike of which is formed separately from the handle portion and of a better grade of metal as for instance, steel, and whereby said spike may be removed and replaced should occasion require without having to destroy the entire tool; further to provide means for renewing and replenishing other parts of the tool such as are most liable to become broken or worn.

Figure 1:
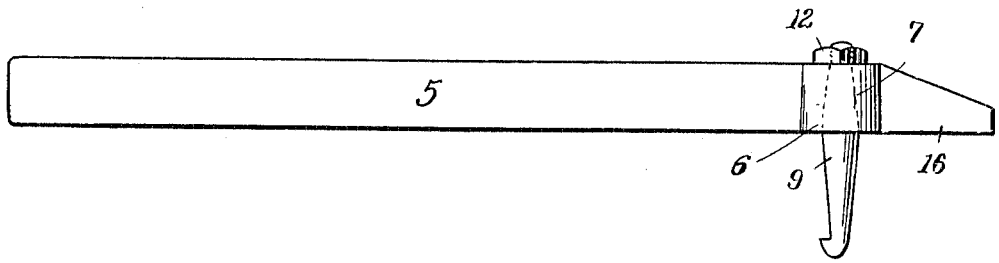
Figure 2:
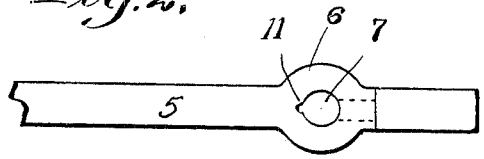
Figure 3:
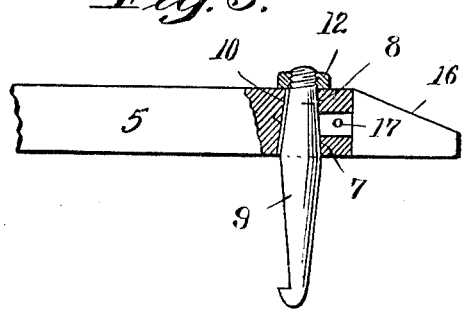

With the above objects in view our invention resides and consists in the novel construction, combination and arrangement of parts shown upon the accompanying sheets of drawings forming a part of this specification, and upon which, Figure 1, shows a side elevation of an improved form of our invention. Fig. 2, is a plan view of the forward end portion of the tool shown in Fig. 1, but with the spike and clamping nut removed. Fig. 3, is a central vertical sectional elevation of the forward end of the bung extractor, shown in Figs. 1 and 2.

Referring in detail to the characters of reference marked upon the drawings 5 represents the tool handle which is usually formed of cast iron or steel and includes an enlarged head portion 6 that is provided with a central vertical tapering hole 7 to receive the tapered shank 8 of a steel spike 9. This shank is preferably round as indicated in Figs. 1 and 2, but is provided with a rib 10 upon one side to fit into a corresponding vertical groove 11 in the side of the hole of the head, to prevent the spike from turning. The upper end of this shank is threaded to receive a tightening nut 12 while the shank and spike are drawn up and retained in position. The forward end portion 16 of the handle like the spike may be made of a better quality of metal and is detachably connected to the head of the handle in any suitable manner as for instance by means of a pin 17 as shown in Fig. 3. This obviously serves to permit new ends to be put on in case the old one become broken, defaced or worn as in use, thus again serving to prevent the necessity of having to throw away the tool should this end portion become broken.

Having thus described our invention what we claim and desire to secure by Letters Patent is—

1. In a device of the character described, the combination with a handle having an aperture therethrough adjacent one of its ends, said aperture tapering from bottom to top, of a spike having its upper portion tapered and being adapted to fit in said aperture said spike being notched adjacent its lower extremity and screw threaded at its upper extremity and adapted to receive a nut thereon and a detachable nose carried at the end of said handle and adjacent the said aperture.

2. In a device of the character described the combination with a handle having an aperture therethrough adjacent one of its ends, said aperture tapering from bottom to top and having a perpendicular groove in one of its sides, of a spike having its upper portion tapered and being adapted to fit in said aperture, said upper portion of said spike carrying a rib adapted to fit into said groove, said spike being notched adjacent its lower extremity and screw threaded at its upper extremity and adapted to receive a nut thereon and a detachable nose carried at the end of said handle and adjacent said aperture.

3. In a device of the character described the combination with a handle having an enlarged portion adjacent one of its ends, an aperture through said enlarged portion, said aperture tapering from bottom to top, of a spike having its upper portion tapered and adapted to fit in said aperture and being screw threaded at its upper end and adapted to receive a nut thereon and being notched adjacent its lower end and a detachable nose carried by the end of said handle adjacent said aperture.

Signed at Waterbury in the county of New Haven and State of Connecticut this twenty-third day of March A. D., 1911.

WILLIAM G. C. KRAUSE.
  GEORGE H. THOMAS.

Witnesses:
 WILLIAM NANE,
 MICHAELL GILETY.